(12) United States Patent
Shimada et al.

(10) Patent No.: US 6,604,193 B1
(45) Date of Patent: Aug. 5, 2003

(54) PROCESSOR IN WHICH REGISTER NUMBER TRANSLATION IS CARRIED OUT

(75) Inventors: Kentaro Shimada, Tokyo (JP); Isao Kimura, Hadano (JP); Kazunari Tanaka, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/458,002

(22) Filed: Dec. 10, 1999

(30) Foreign Application Priority Data

Dec. 11, 1998 (JP) .......................................... 10-352257

(51) Int. Cl.$^7$ ................................................ G06F 9/38
(52) U.S. Cl. ...................... 712/228; 712/216; 712/217; 712/218
(58) Field of Search ................................ 712/217, 218, 712/228, 215

(56) References Cited

U.S. PATENT DOCUMENTS 5,941,977 A * 8/1999 Panwar et al. ................ 712/23
6,092,175 A * 7/2000 Levy et al. ................... 712/23

FOREIGN PATENT DOCUMENTS

| JP | 520010 | 1/1993 |
|----|--------|--------|
| JP | 9325888 | 12/1997 |

* cited by examiner

Primary Examiner—William M. Treat
(74) Attorney, Agent, or Firm—Antonelli, Terry, Stout & Kraus, LLP (57) ABSTRACT

A processor has an instruction decoder including a register number translation unit for translating a register number specified by an instruction into the number of a physical register to be actually used in execution of the instruction. In an operation to decode an instruction, after a register number specified by the instruction is translated into the number of a physical register to be actually used in execution of the instruction, a register rename unit replaces the number of the physical register with the number of a rename register. As a result, the translation of a register number specified by the instruction into the number of a physical register to be actually used in execution of the instruction can be changed dynamically at run time even for a superscalar processor carrying out register renaming operations.

12 Claims, 9 Drawing Sheets

PROCESSOR IN WHICH REGISTER NUMBER TRANSLATION IS CARRIED OUT

BACKGROUND OF THE INVENTION

The present invention relates to a processor in which a register number specified in an instruction is translated into the number of a physical register to be actually used in the execution of the instruction and the register number translation is changed dynamically at run time; and more particularly, the invention relates to a technology of register number translation, whereby a processor carries out a register renaming operation at a high speed.

If translation of a register number specified in an instruction into the number of a physical register to be actually used in the execution of the instruction by a processor is changed dynamically at run time, the following two effects are obtained.

First, it is possible to have more physical registers than the number of registers which can be specified by an instruction. Recently, with progress in device technology, it is easy to provide a register file that is a collection of many physical registers in a processor. However, it is not so easy to raise the number of registers that can be specified by at instruction to keep up with the increase in physical register count. This is because, in most processors, the length of the instruction is limited so that the number of bits used to specify the number of a register in the instruction is also limited as well. In addition, unless upward compatibility with an instruction with a small number of bits used for, specifying registers that can be used is sustained, upward binary compatibility of software can not be sustained as well. Thus, if a register number specified by an instruction can be translated into the number of a physical register to be actually used in the execution of the instruction with the resulting physical register number varying from time to time in accordance with a predetermined rule set in advance, it is not necessary to limit the number of physical registers to the number of registers which can be specified by an instruction even if the number of specified registers is unchanged.

Second, it is possible to use different physical registers in a sequence of the same instructions. Two examples of the second effect are described as follows.

The first example of the effect is seen in loop iteration processing. For example each time a loop iteration is completed, a register number specified in an instruction is translated into the number of a physical register which is actually used in the execution of the instruction and the specified register may be different from that used in the immediately preceding loop iteration. Since different physical registers are used in the loop iterations, the use of a physical register in a loop iteration does not block execution of other loop iterations. As a result, loop iterations can be executed concurrently. The concurrent execution of loop iterations has a great effect on the superscalar technology developed in recent years to implement parallel execution of instructions.

The second example of the effect is seen in operations to save and restore the contents of registers in a subroutine call. When a subroutine is called, the contents of registers are normally saved by storing them in a memory. As the processing of the subroutine is completed, the contents stored in the memory are read out and restored back to the registers. By allocating different physical registers to be actually used in the execution of a called subroutine to numbers indicating registers specified by instructions in the subroutine at the time the subroutine is called, the subroutine will use physical which are different from those used by the calling routine so that it is possible to eliminate operations to save and restore the contents of the registers used in the calling routine. At the end of the processing of the called subroutine, the allocation of the numbers of physical registers to register numbers specified in instructions is restored back to the allocation specified prior to the subroutine call.

Figure 9:
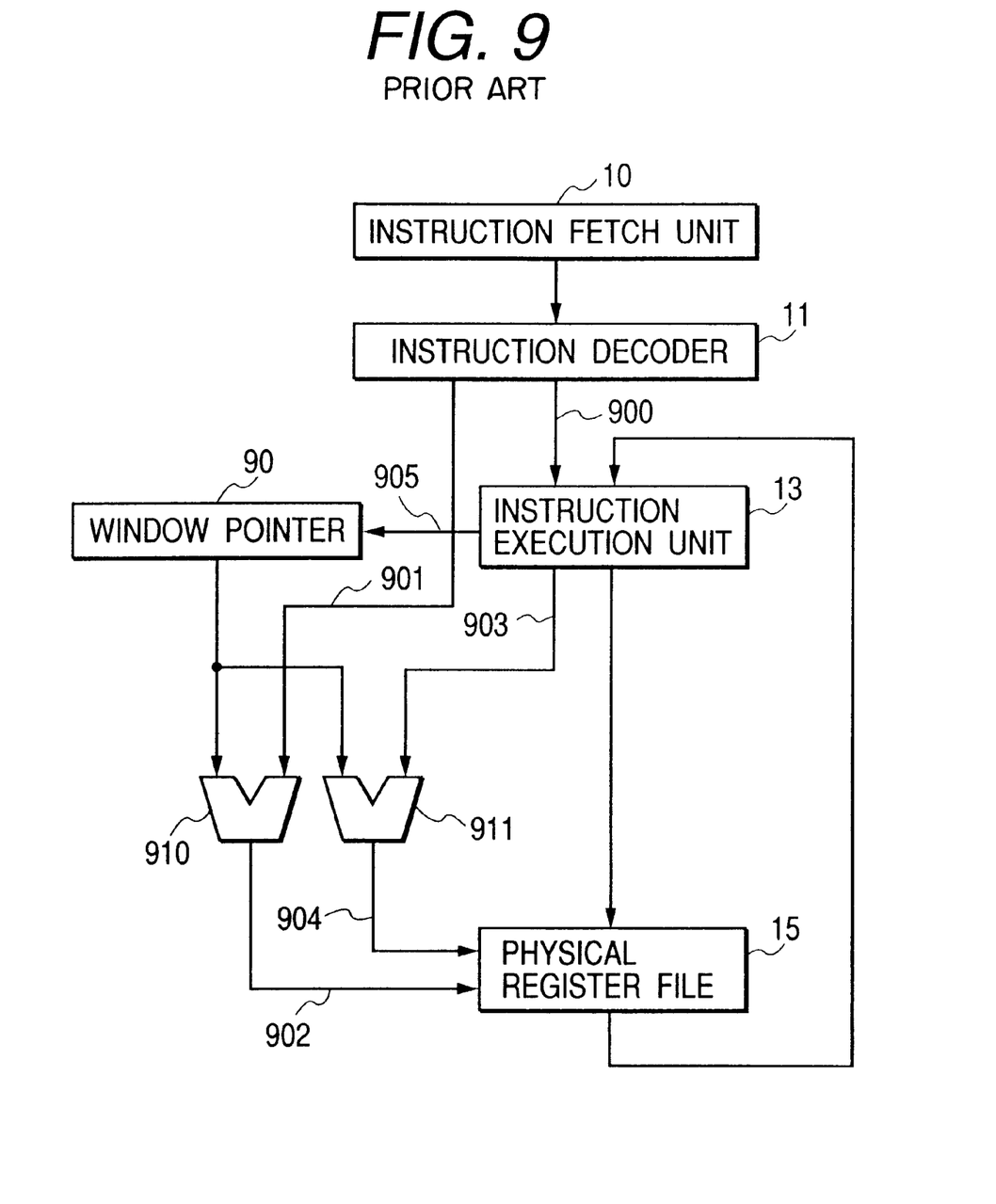
FIG. 9 is a block diagram showing a typical conventional processor wherein a register number specified in an instruction is different from the number of a physical register to be actually used in the execution of the instruction.

By allowing the allocation of the numbers of physical registers to register numbers specified in instructions to be changed dynamically at run time as described above, the effects explained above can be obtained. FIG. 9 is a diagram showing a typical conventional processor implementing this type of dynamic translation. In the processor shown in FIG. 9, the instruction code of a typical instruction is transferred from an instruction fetch unit 10 to an instruction decoder 11. The instruction decoder 11 decodes the instruction code to generate a control signal 900 for controlling an instruction execution unit 13. As a result of the decoding, the instruction decoder 11 also generates the number 901 of a register to be read out. The number 901 of the register to be read out is specified in the instruction. The number 901 of the register to be read out is added to a window pointer 90 by a read register number adder 910 to produce a number 902 of a physical register from which data is to be actually read out. By the same token, the number 903 of a write register is also specified in the instruction. The number 903 of the write register is added to the window pointer 90 by a write register number adder 911 to produce a number 904 of a physical register into which data is to be actually stored. The instruction execution unit 13 reads out the contents of the physical register indicated by the number 902. The physical register indicated by the number 902 is typically included in a register file 15. The instruction execution unit 13 executes the instruction in accordance with the control signal 900, using the contents of the physical register indicated by the number 902 in the execution of the instruction. A result of the execution of the instruction is stored in the register indicated by the number 904. The physical register indicated by the number 904 is typically included in the register file 15 as well. As described above, the register numbers 901 and 903 specified in the instruction are translated respectively into the numbers 902 and 904 of registers to be actually used in the execution of the instruction. In order to change the results of translation, a special slide instruction is executed to generate a window change signal 905 for changing, the value of the window pointer 90.

Processor technologies developed in recent years include a superscalar technology and, particularly, an out of order execution technique which exhibit great effects. The superscalar technology allows a plurality of instructions to be executed concurrently as described earlier. With the out of order execution technique, the original execution order of instructions in a program is changed by rearranging the instructions. In the case of the out of order execution technique, in particular, the allocation of physical registers to be actually used is changed dynamically at run time so as to prevent the execution of an instruction from being blocked by the current use of the physical registers in other instructions. Referred to as a register renaming technique, the method to dynamically change the allocation of physical registers to be actually used in execution of instructions at run time increases the processing efficiency of the processor.

However, it is difficult to apply the register renaming technique as it is to a processor like the one in FIG. 9 wherein a register number specified in an instruction is translated into another number of a physical register to be actually used in the execution of the instruction. This is because, in an operation to read out data from a register or write data into a register according the register renaming technique, the number of a renamed register allocated at run time is used, making this technique inapplicable to a configuration like the one shown in FIG. 9. As for a superscalar computer not adopting the out of order execution technique, a technology to increase the processing efficiency by providing three window pointers is effective as is disclosed in Japanese Published Unexamined Patent Application Nos. Hei 5-20010 and Hei 9-325888. However, this technology can not be applied to processors adopting the out of order execution technique or the register naming technique.

As an extension of the out of order execution technique, there is adopted a speculative execution technique to execute an instruction to be executed after a conditional branch instruction is executed prior to completion of formation of a judgment as to whether or not the flow of the execution branches and to execute an instruction following a preceding instruction with a probability of the preceding instruction's being interrupted. In the case of a branch instruction, a branch destination is predicted and an instruction at the branch destination is executed speculatively. In the case of an instruction with a probability of the instruction's being interrupted, an immediately succeeding instruction is executed speculatively on the assumption that the instruction is not indeed interrupted. In the case of an instruction executed speculatively in accordance with the speculative execution technique, a result of the execution is generally stored in a rename register. The result is discarded in case the branch operation has been predicted incorrectly or an interrupt does occur in opposition to the assumptions.

Changing the value of the window pointer in a processor having a configuration like the one shown in FIG. 9 in order to implement the speculative execution technique is a big problem. For example, in the configuration shown in FIG. 9, the value of the window point 90 must be changed by execution of a special slide instruction in order to change the translation of a register number specified in an instruction into the number of a physical register to be actually used in the execution of the instruction. If the translation is changed by speculative execution of the special slide instruction, however, the value of the window pointer 90 will remain modified as it is even if the speculative execution has to be canceled in case a branch operation has been predicted incorrectly or an interrupt has occurred.

SUMMARY OF THE INVENTION

It is an object of the present invention to provide a processor adopting a superscalar technology with a capability of dynamically changing the translation of a register number specified in an instruction into the number of a physical register to be actually used in the execution of the instruction at run time with a high degree of efficiency even in an operation to rename a register.

It is another object of the present invention to provide the processor adopting the superscalar technology with a capability of dynamically changing the translation of a register number specified in an instruction into the number of a physical register to be actually used in the execution of the instruction by speculative execution of a slide instruction.

It is still another object of the present invention to provide the processor adopting the superscalar technology with a capability of nullifying a result of speculative execution of a slide instruction to dynamically change the translation of a register number specified in an instruction into the number of a physical register to be actually used in the execution of the instruction in case the speculative execution has to be canceled.

In order to solve the problems described above, the processor provided by the present invention comprises:
  a register number translation unit for translating a register number specified in an instruction into the number of a physical register; and
  a register rename unit for further replacing the number of a physical register with a rename register number temporarily,
  wherein, after the register number translation unit translates a register number specified in an instruction into the number of a physical register, the register rename unit replaces the number of the physical register with a rename register number.

With the above configuration, a register number specified in an instruction is first translated into the number of a physical register. Thus, by merely providing a register rename unit for replacing the number of a physical register; with the number of a rename register naming can be implemented easily even if a register number specified in an instruction and the number of a physical register are different from each other.

In addition, the register number translation unit is included in an instruction decoder for decoding an instruction and determining what is to be executed for the instruction prior to execution of the instruction. Since a register number specified in an instruction is translated into the number of a physical register before execution of the instruction in this configuration, there is neither a need to suspend execution of an instruction nor a penalty caused by translation of a register number.

Moreover, there is provided a slide instruction for changing the translation of a register number specified in an instruction into the number of a physical register in the register number translation unit. Furthermore, there is provided an immediate register number translation update means which is used for immediately changing translation of a register number specified in an instruction into the number of a physical register in case a result of decoding the instruction output by the instruction decoder indicates that the instruction is a slide instruction.

The processor provided by the present invention is characterized in that,
  the instruction decoder decodes a plurality of instructions concurrently;
  the instruction decoder is provided with:
    a first register number translation unit for outputting a result of translation obtained prior to execution of a slide instruction for each of the decoded instructions; and
    a second register number translation unit for outputting a result of translation obtained after execution of a slide instruction for each of the decoded instructions; and
  the immediate register number translation update means has a transformation result switching means which is used for switching a result of register number translation from an output of the first register number translation unit for an instruction preceding a slide instruction to an output of the second register number translation unit for an instruction succeeding the slide instruction in case a result of decoding an instruction output by the instruction decoder indicates that the instruction is a slide instruction.

In the configuration described above, when a result of decoding an instruction output by the instruction decoder indicates that the instruction is a slide instruction, the slide instruction can be executed immediately to change translation of a register number specified in an instruction succeeding the slide instruction into the number of a physical register without the need to re-decode instructions being decoded concurrently with the slide, instruction. It should be noted that, also in this configuration, two or more slide instructions may be detected among a plurality of instructions decoded concurrently. In this case, instructions following the second slide instruction are re-decoded and, in the mean time, settings of numbers of physical registers obtained as a result of translations by the first and second register number translation units are updated.

On the other hand, it is possible to provide an alternative configuration including only one register number translation unit in place of the configuration employing a pair of register number translation units as described above. In the alternative configuration, when a slide instruction is detected, the slide instruction is executed to update translation of a register number specified in an instruction into the number of a physical register. The alternative configuration includes a means for detecting an instruction which is decoded concurrently with the detected slide instruction, appears in the original program instruction sequence after the slide instruction and uses a register. Instructions following the detected instruction using a register are re-decoded and register numbers specified in the re-decoded instructions are translated into numbers of physical registers. This configuration is capable of easily keeping up with a need to set the range of updating called a slide width, that is, the magnitude of a change for updating translation of a register number specified in an instruction into the number of a physical register by using the slide instruction itself with a high degree of freedom.

The processor provided by the present invention is also characterized in that, the instruction decoder speculatively decodes an instruction before execution of the instruction is confirmed and, if the speculatively decoded instruction is a slide instruction, the immediate register number translation update means speculatively updates translation of a register number specified in an instruction into the number of a physical register; and there is provided a register number translation update canceling means which is used for canceling updating of translation of a register number specified in an instruction into the number of a physical register done speculatively by the immediate register number translation update means in case the slide instruction is canceled.

The register number translation update canceling means comprises:

a register number translation recording means for recording a translation of a register number specified in an instruction into the number of a physical register obtained prior to speculative updating carried out by a slide instruction; and a register number translation restoring means which is used for restoring a translation of a register number specified in an instruction into the number of a physical register to a translation recorded by the register number translation recording means in case the slide instruction is canceled.

Other characteristics of the present invention will become apparent from the following description of embodiments of the present invention.

DETAILED DESCRIPTION OF THE PREFERRED EMBODIMENTS

Some preferred embodiments of the present invention described to with reference to the accompanying diagrams. It should be noted that, in the following description, there are as many signal lines shown in the figure as bits required for transmitting all information, such as a necessary instruction code and a register number.

Figure 1:
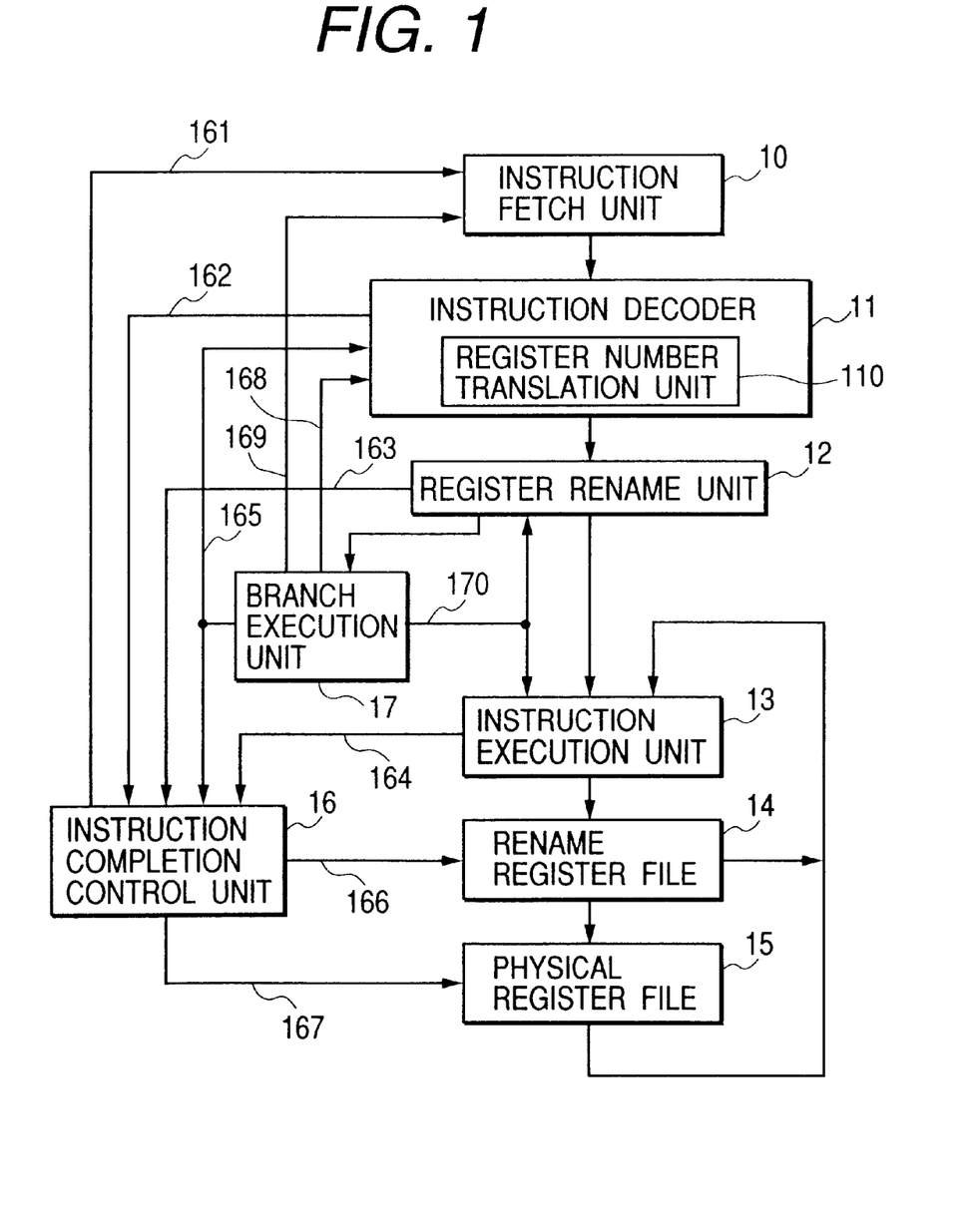
FIG. 1 is a block diagram showing an embodiment implementing the entire configuration of a processor provided by the present invention.

FIG. 1 is a block diagram showing an embodiment implementing a processor provided by the present invention.

An instruction fetch unit 10 fetches an instruction code from a memory external to the processor or from an instruction cache, and transfers the instruction code to an instruction decoder 11. When a branch instruction is detected, the instruction fetch unit 10 predicts the destination of the branch instruction. Then, the instruction fetch unit 10 fetches an instruction at the predicted branch destination, transferring the fetched instruction to the instruction decoder 11. In this way, the instruction decoder 11 speculatively decodes the instruction before the actual execution of the instruction is ascertained.

The instruction decoder 11 has a register number translation unit 110 for translating a register number specified in an instruction code received from the instruction fetch unit 10 into the number of a physical register included in a physical register file 15.

The number of a physical register obtained as a result of the register number translation is supplied to a register rename unit 12 along with other instruction control information generated by the instruction decoder 11.

The register rename unit 12 further uses the number of a rename register included in a rename register file 14 as a substitute for the number of a physical register, supplying the number of a rename register to an instruction execution unit 13 along with the same instruction control information. In the case of a branch instruction, the number of a rename register is supplied to a branch execution unit 17 along with the same instruction control information. More specifically, for the number of a physical register into which data is to be written by an instruction, a new number of a rename register is used to replace the number of the physical register allocated to the instruction. At that time, a rename register allocation signal 163 is used to inform an instruction completion control unit 16 that the number of a rename register has been newly allocated to replace the number of the physical register. For the number of a physical register from which data is to be read out, on the other hand, the data may have been stored in a rename register, but not transferred to the physical register. In this case, the number of the rename register allocated to a write instruction to write data into the physical register in the past is again used to replace the number of the physical register, if such a write instruction existed with the number of a rename register used to replace the number of the physical register allocated to the write instruction the case where the write instruction has not been executed or, in the case where if the write instruction has been executed, the written data has not been transferred from the rename register file 14 to the physical register file 15. If a write instruction did not exist in the past for the number of a physical register, or if a write instruction existed in the past for the number of a physical register, the write instruction has been executed and the written data has been transferred from the rename register file 14 to the physical register file 15, on the other hand, the number of the physical register is transferred as it is to the instruction execution unit 13 without the need to newly allocate the number of a rename register to replace the number of the physical register in particular in order to read out data from the physical register.

The instruction execution unit 13 executes the read instruction to read out data from the rename register file 14 by using the number of a rename register for the read instruction received from the register rename unit 12, or to read out data from the physical register file 15 by using the number of a physical register for the read instruction received from the register rename unit 12. If the write instruction to write data into the rename register has not been executed, the read instruction received from the register rename unit 12 is reserved till the write instruction is executed. In this case, if an instruction fetched subsequently to read out data from a register already containing the data is detected, the read instruction is executed earlier than the reserved read instruction. Such early execution of a later instruction is known as out of order execution processing. Even if the number of a physical register of a write instruction fetched subsequently matches the number of a physical register of a reserved read or write instruction, the instruction execution unit 13 actually writes data into a rename register newly allocated to the subsequent write instruction instead of writing data directly into the physical register. As a result, even if a reserved instruction is left behind a subsequent instruction in out of order execution processing, the contents of a rename register and a physical register to be read out will not be destroyed or updated by a result of execution of the subsequent write instruction which is executed first. This is an effect of the register rename function.

When an instruction is executed, a result of the instruction execution is transferred to a rename register which is included in the rename register file 14 and indicated by a rename register number for the operation of the execution generated by the register rename unit 12. In addition, the instruction completion control unit 16 is informed by an execution ending signal 164 that the execution of the instruction has been completed.

A branch instruction is executed by a branch execution unit 17. At the end of the execution, an execution ending signal 165 is transmitted to the instruction completion control unit 16 and to the instruction decoder 11. When an actual branch destination of the executed branch instruction is found to be different from a branch destination predicted by the instruction fetch unit 10 at the end of the execution of the branch instruction, this indicates that the speculative execution based on the predicted branch destination has ended in a failure. When a failure of a speculative execution is ascertained, an instruction refetch signal 169 due to speculation failure is transmitted to the instruction fetch unit 10 to newly fetch an instruction from the actual branch destination. In addition, a canceling signal 170 due to the speculation failure is transmitted to the register rename unit 12 and to the instruction execution unit 13 to cancel a speculatively allocated rename register and speculative execution of an instruction. In particular, a translation update canceling signal 168 is transmitted to the instruction decoder 11.

In response to execution ending signals 164 and 165 from the instruction execution unit 13 or the branch execution unit 17, the instruction completion control unit 16 carries out processing to end the instructions, which have completed the executions thereof, in the original order, that is, in the program order of the instructions. The instruction completion control unit 16 then sequentially reads out pieces of data from the rename register file 14 by using read command signals 166 and writes the data into physical registers which are included in the physical register file 15 and indicated by original physical register numbers by using write command signals 167. In this way, since data is written into the physical register file 15 in the program order, the data is not stored in the file 15 in a contradictory order even if the instruction execution unit 13 changes the order of instruction executions in accordance with the out of order execution technique.

Here, relevant to the core of the present invention is the register number translation unit 110 employed in the instruction decoder 11. Since the register number translation unit 110 translates a register number specified by an instruction into the number of a physical register to be actually used in execution of the instruction, the two effects described earlier are obtained. To be more specific, the number of physical registers in the processor can be greater than a maximum number of different registers which can be specified by an instruction code, and different physical registers can be allocated to the same instruction code. By providing the instruction decoder 11 with the register number translation unit 110, the register rename unit 12 can merely carry out register rename processing for the number of a physical register to be actually used in the execution of an instruction instead of register rename processing for a register number specified in an instruction, making the processing simpler.

In addition, translation of a register number specified in an instruction into the number of a physical register to be used actually in the execution of the instruction or, to put it concretely, a number displacement used in the register number translation, can be changed by execution of a slide instruction. When the instruction decoder 11 employed in the processor shown in FIG. 1 decodes two or more slide instructions or a slide instruction and an instruction making an access to a register at the same time, an instruction refetch mark signal 162 to refetch a specific instruction is issued to the instruction completion control unit 16. After all instructions preceding the specific instruction are executed by the instruction execution unit 13, an execution ending signal 164 or 165 is transmitted to the instruction completion control unit 16 which then outputs an instruction refetch signal 161 to the instruction fetch unit 10. Receiving the instruction fetch signal 161, the instruction fetch unit 10 refetches the specific instruction and newly transfers its instruction code to the instruction decoder 11. Furthermore, when a speculation failure is ascertained in the branch execution unit 17, a translation update canceling signal 168 is transmitted to the instruction decoder 11 which cancels register number translation updating carried out by speculative execution of a slide instruction, returning the operation to translation of register numbers specified in instructions into numbers of actual physical registers performed by the register number translation unit 110 prior to the speculative execution, that is, returning to a state at execution of a branch instruction, the failure of which is ascertained.

Figure 2:
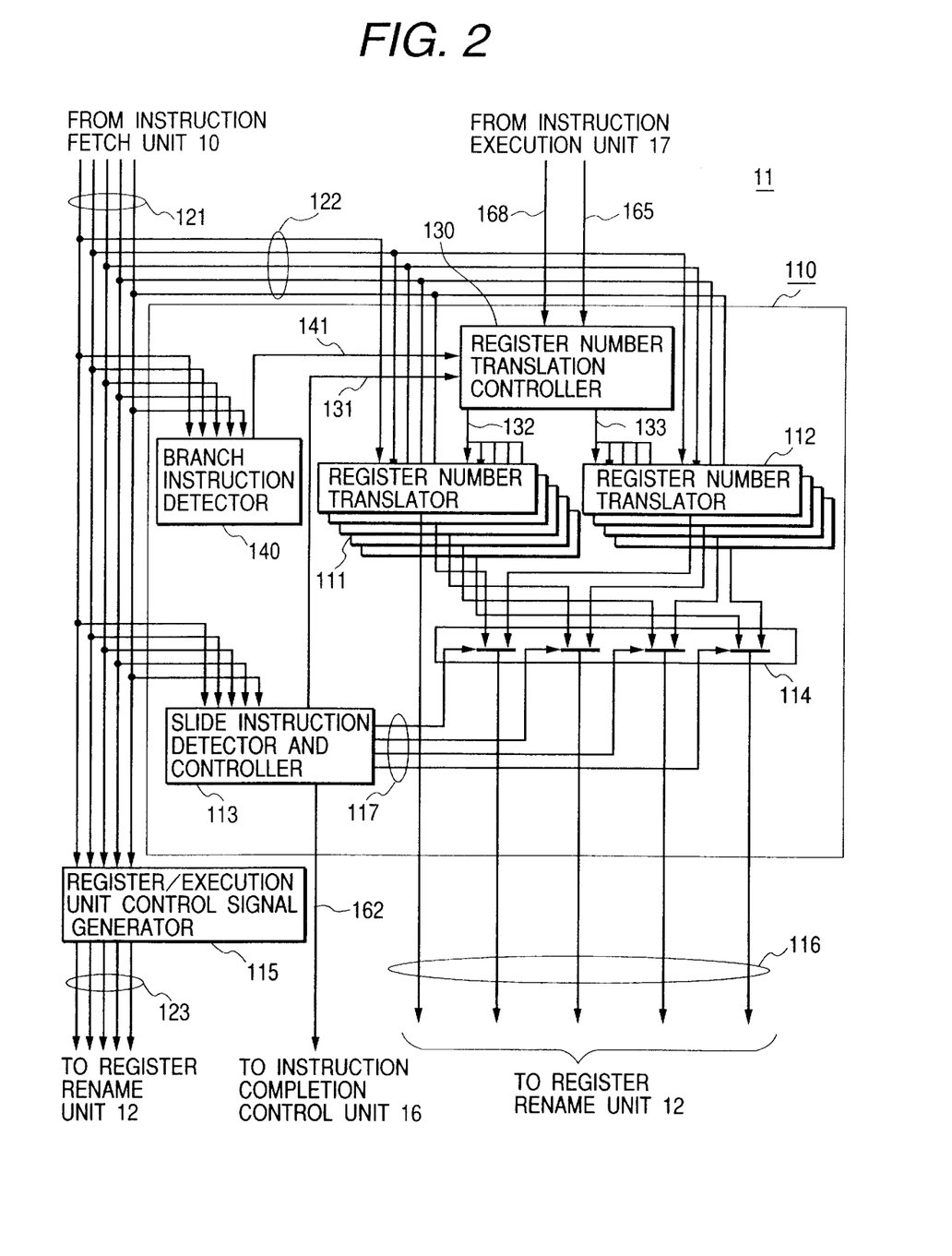
FIG. 2 is a block diagram showing an embodiment implementing an instruction decoder employed in the processor provided by the present invention.

FIG. 2 is a block diagram showing an embodiment implementing the instruction decoder 11 employed in the processor provided by the present invention. In particular, the figure shows a case in which five instructions are decoded concurrently and a slide instruction is executed speculatively in accordance with a branch prediction.

In the example shown in FIG. 2, codes 121 of five instructions are received at the same time from the instruction fetch unit 10 through signal lines 121. At that time, register number portions of the instruction codes are extracted to a first register number translator 111 and a second register number translator 112 by way of signal lines 122. The first register number translator 111 translates register numbers specified in the five instructions into numbers of physical registers by assuming that the instructions do not include a slide instruction. On the other hand, the second register number translator 112 translates register numbers specified in the five instructions into numbers of physical registers by assuming that the first instruction is a slide instruction. A register number selector 114 selects the numbers of physical registers output by the first register number translator 111 or the second register number translator 112, supplying the selected physical register numbers to the register rename unit 12.

More specifically, a register number translation controller 130 supplies a translation base value 132 for instructions prior to execution of a slide instruction to the first register number translator 111 and a translation base value 133 for instructions after execution of a slide instruction to the second register number translator 112. The first register number translator 111 adds the translation base value 132 to register numbers specified in the five instructions received through the signal lines 122. On the other hand, the second register number translator 112 adds the translation base value 133 to register numbers specified in the last four instructions, that is, the five instructions excluding the first one. The codes 121 of the five instructions received from the instruction fetch unit 10 are supplied also to a slide instruction detector and controller 113. When a slide instruction is detected by the slide instruction detector and controller 113 among the five instructions, a select signal 117 is issued to the register number selector 114 to select the numbers of the physical registers output by the first register number translator 111 for an instruction preceding the slide instruction and the numbers of the physical registers output by the second register number translator 112 for an instruction succeeding the slide instruction. The register number selector 114 selects the numbers of physical registers output by the first register number translator 111 or the second register number translator 112 for the second to fifth instructions in accordance with the select signal 117. More specifically register number translation based on the translation base value 132 for instructions prior to the execution of the, slide instruction is applied to instructions preceding the slide instruction. On the other hand, register number translation based on the translation base value 133 for instructions after the execution of the slide instruction is applied to instructions succeeding the slide instruction. Results of the translation are supplied to the register rename unit 12 by way of the register number selector 114 and signal lines 116. Since the first instruction does not succeed the detected slide instruction, it is not necessary to select a result of translation generated by the first register number translator 111 or the second register number translator 112 for the first instruction by using the register number selector 114. Thus, a result of translation generated by the first set of register number registers 111 for the first instruction is output directly to one of the signal lines 116, bypassing the register number selector 114. For this reason, while the first register number translator 111 translates register numbers for all the five instructions by using the translation base value 132 for instructions prior to the execution of the slide instruction, the second register number translator 112 translates register numbers only for the last four instructions, that is, the second to fifth instructions, by using the translation base value 133 for instructions after the execution of the slide instruction.

When a slide instruction is detected, the slide instruction detector and controller 113 outputs a slide instruction detection signal 131 to the register number translation controller 130 to update the translation base values 132 and 133 as will be described later. In addition, in the configuration shown in FIG. 2, the register number selector 114 is capable of merely selecting numbers of physical registers for only one slide instruction existing among the five instructions received from the signal lines 121. If two or more slide instructions are included in the five instructions, correct translation results can not be produced for instructions after the second slide instruction. In order to solve this problem, when the second slide instruction is detected, the slide instruction detector/controller 113 issues an instruction refetch mark signal 162 to the instruction completion control unit 16. In this way, codes of instructions following the second slide instruction are again received from the instruction fetch unit 10 through the signal lines 121 for re-decoding by the instruction decoder 11.

When a branch instruction detector 140 detects a branch instruction among codes of the five instructions, a branch instruction detection signal 141 is output to the register number translation controller 130. The register number translation controller 130 controls updating of register number translation carried out by a slide instruction in a speculative execution state prior to execution of a branch instruction in accordance with the branch instruction detection signal 141 and an execution ending signal 165 output by the branch execution unit 17. When a translation update canceling signal 168 indicating a failure of a speculative execution is received from the branch execution unit 17, the register number translation controller 130 cancels updating of the translation base values 132 and 133 carried out by a slide instruction as described above.

Other control signals required in execution of an instruction are generated by a register/execution unit control signal generator 115 to convey control information. These control signals are transmitted to the register rename unit 12 by way of signal lines 123 to be used thereby. The control signals are then transmitted to the instruction execution unit 13 from the register rename unit 12 to be used by the instruction execution unit 13.

Figure 3:
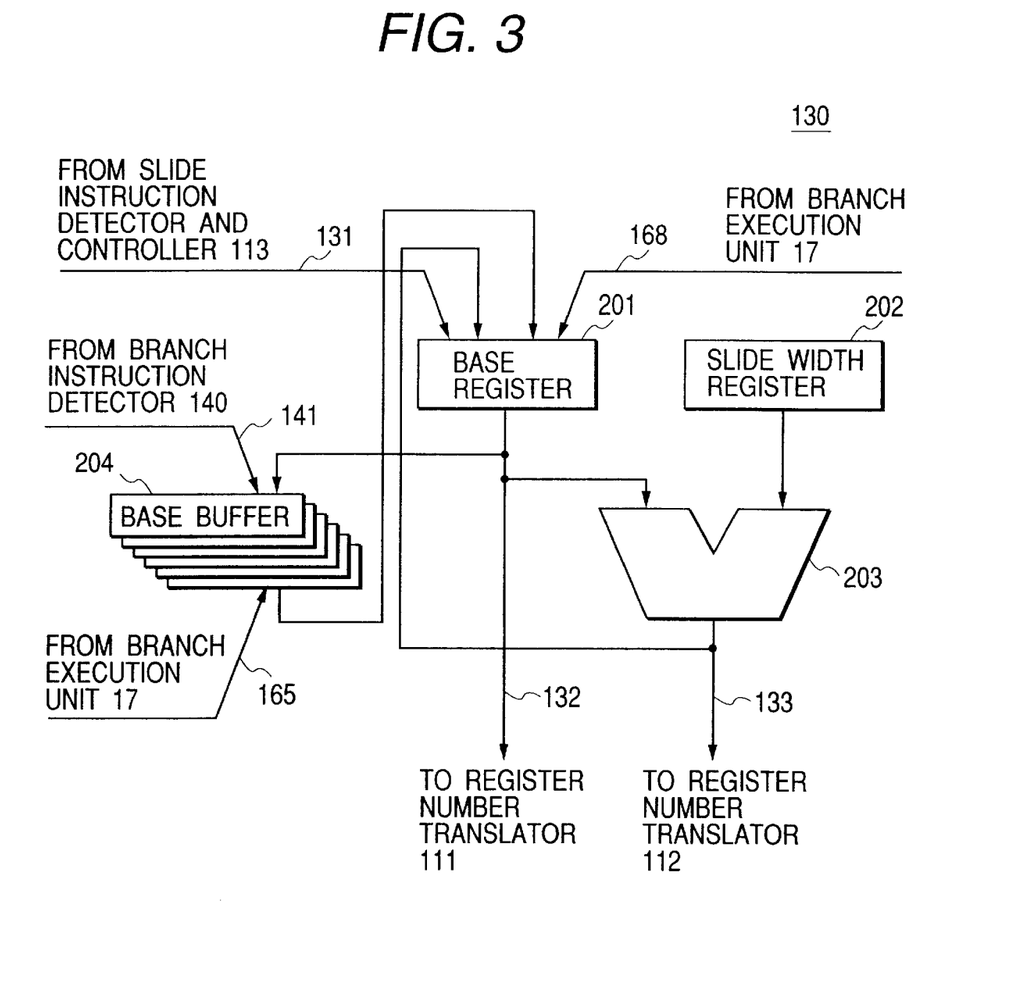
FIG. 3 is a block diagram showing an embodiment implementing a register number translation controller employed in the instruction decoder of the processor provided by the present invention.

FIG. 3 is a diagram showing a register number translation controller 130 which can be used in the embodiment implementing the instruction decoder 11 shown in FIG. 2.

As shown in FIG. 3, the register number translation controller 30 comprises a base register 201, a slide width register 202, an adder 203 and a base buffer 204. The base register 201 holds a translation base value. A translation base value is a current number displacement to be used in translation of a register number specified in an instruction into the number of a physical register to be actually used in execution of the instruction. The slide width register 202 holds the magnitude of a change in number displacement to be made in one execution of a slide instruction. The adder 203 adds the change to the contents of the base register 201 and, when necessary, stores the sum in the base register 201. The base buffer 204 is used for recording a history of varying contents of the base register 201 prior to speculative execution of a branch instruction. The contents of the base register 201 are supplied to the first register number translator 111 for translation prior to execution of a slide instruction as it is. The contents of the base register 201 supplied to the first register number translator 111 are referred to as the translation base value 132 cited earlier. On the other hand, a sum of the contents of the base register 201 and the change width held in the slide width register 202 is supplied to the second register number translator 112 for translation after execution of a slide instruction. The sum output by the adder 203 is referred to as the translation base value 133 cited above.

When the slide instruction detector/controller 113 outputs a slide instruction detection signal 131, a sum output by the adder 203 is stored in the base register 201. Thus, the contents of the base register 201 are updated. As a result, as described above, the translation base values 132 and 133 are also updated for instructions following a set of five instructions currently being decoded.

When a branch instruction detection signal 141 is received from the branch instruction detector 140, the current contents of the base register 201 are transferred to the base buffer 204. In this way, the base buffer 204 contains a history of varying contents of the base register 201 corresponding to events of branch instructions on their way from the instruction decoder 11 to the branch execution unit 17. When an execution ending signal 165 indicating completion of execution of a branch instruction is received from the branch execution unit 17, the contents stored as an event of history corresponding to the completed branch instruction are read out from the base buffer 204. If a translation update canceling signal 168 is also received from the branch execution unit 17 at the same time, the contents read out from the base buffer 204 are restored to the base register 201. In this way, the contents of the base register 201 are restored in the event of a speculative execution failure which needs to cancel the updating of the contents of the base register 201 by speculative execution of a slide instruction following a failing branch instruction.

Figure 4:
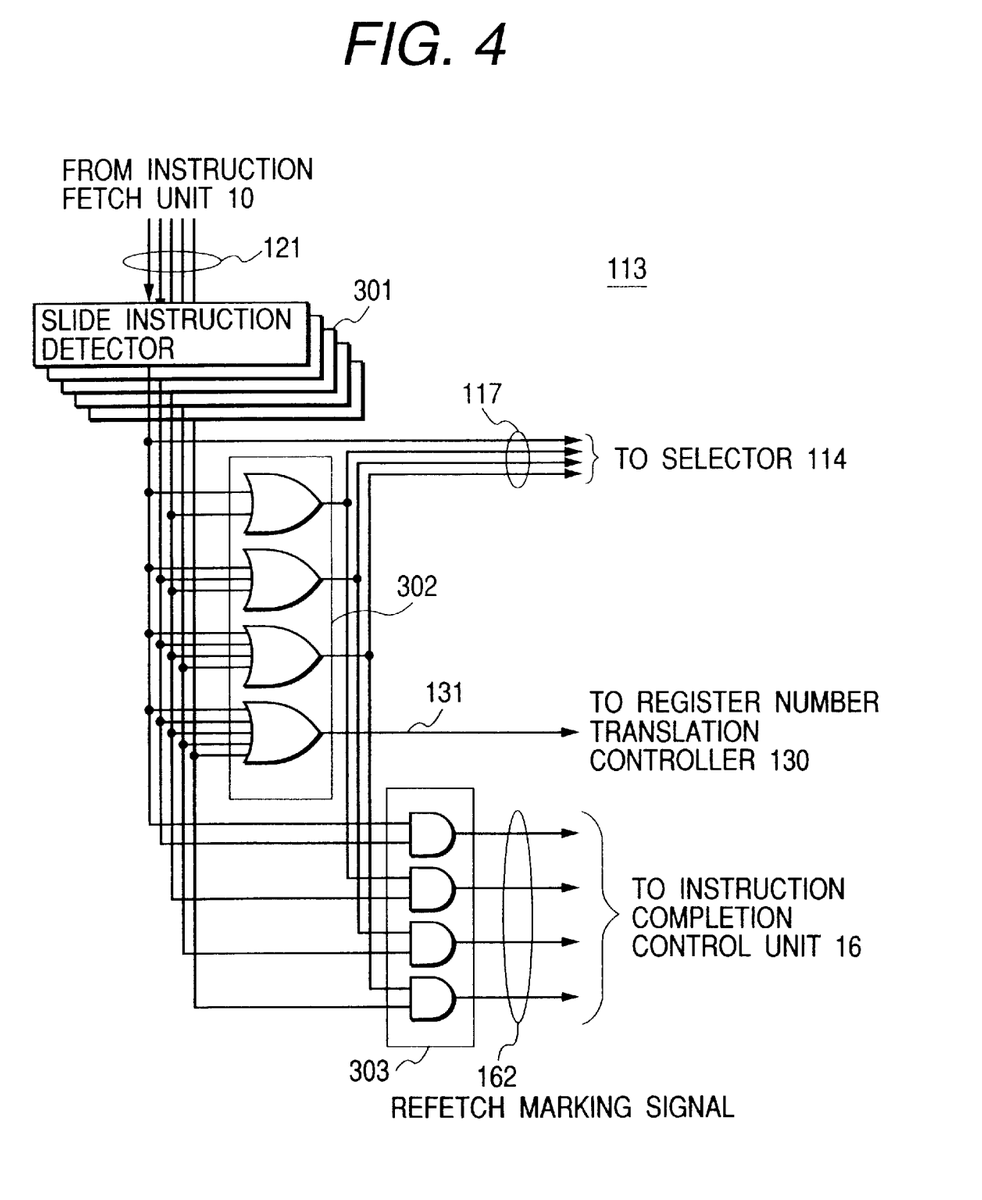
FIG. 4 is a schematic diagram showing an embodiment implementing a slide instruction detector and controller employed in the instruction decoder of the processor provided by the present invention.

FIG. 4 is a diagram showing an embodiment implementing the slide instruction detector and controller 113 employed in the instruction decoder 11 shown in FIG. 2.

In the slide instruction detector and controller 113 shown in FIG. 4, the codes of the five instructions received from the instruction fetch unit 10 are examined simultaneously by a slide instruction detector 301 to determine whether or not the instructions include a slide instruction. As shown in the figure, results of examination output by the slide instruction detector 301 are supplied to an OR gate circuit 302 for computing logical sums of examination results for the first two instructions, the first three instructions, the first four instructions and all then five instructions. The result of examination for the first instruction as well as the logical sums of examination results for the first two instructions, the first three instructions and the first four instructions are supplied to the register number selector 114 as four select signals 117; respectively. To be more specific, the first select signal 117 in the top down order shown in FIG. 4 indicates that the first instruction is a slide instruction. The second select signal 117 indicates that at least the first or second instruction in the top down order is a slide instruction. The third select signal 117 indicates that at least the first, second or third instruction in the top down order is a slide instruction. The fourth select signal 117 indicates that at least the first, second, third or fourth instruction in the top down order is a slide instruction. The first select signal 117 drives the register number selector 114 shown in FIG. 2 to switch from a result of translation of a register number specified in the code of the second instruction output by the first register number translator 111 to a result of translation of a register number specified in the code of the second instruction output by the second register number translator 112. By the same token, the second select signal 117 drives the register number selector 114 shown in FIG. 2 to switch from a result of translation of a register number specified in the code of the third instruction output by the first register number translator 111 to a result of translation of a register number specified in the code of the third instruction output by the second register number translator 112. Similarly, the third select signal 117 drives the register number selector 114 shown in FIG. 2 to switch from a result of translation of a register number specified in the code of the fourth instruction output by the first register number translator 111 to a result of translation of a register number specified in the code of the fourth instruction output by the second register number translator 112. Likewise, the fourth select signal 117 drives the register number selector 114 shown in FIG. 2 to switch from a result of translation of a register number specified in the code of the fifth instruction output by the first register number translator 111 to a result of translation of a register number specified in the code of the fifth instruction output by the second register number translator 112.

The output of the fourth OR gate circuit 302 for computing a logical sum of examination results for all five instructions as described above is supplied to the base register 201 employed in the register number translation controller 30 shown in FIG. 3 as a slide instruction detection signal 131 to request that the translation base value be updated.

In addition, as shown in FIG. 4, the outputs of the OR gate circuit 302 and the outputs of the slide instruction detector 301 are properly supplied to an AND gate circuit 303 for computing logical products to be output as refetch mark signals 162 to the instruction completion control unit 16. The first logical product output by the AND gate circuit 303 indicate's that both the first and the second of the five fetched instructions are slide instructions. The second logical product output by the AND gate circuit 303 indicates that at least one of the first and the second of the five fetched instructions is a slide instruction and the third instruction is also a slide instruction. The third logical product output by the AND gate circuit 303 indicates that at least one of the first, the second and the third of the five fetched instructions is a slide instruction and the fourth instruction is also a slide instruction. The fourth logical product output by the AND gate circuit 303 indicates that at least one of the first, the second, the third and the fourth of the five fetched instructions is a slide instruction and the fifth instruction is also a slide instruction. The instruction completion control unit 16 outputs an instruction refetch signal 161 for a first instruction causing the generation of the refetch mark signal 162 to the instruction fetch unit 10.

As described above, the embodiment implementing the instruction decoder 11 shown in FIG. 2 includes the slide instruction detector and controller 113 shown in FIG. 4 and the register number translation controller 130 of FIG. 3 in addition to the first register number translator 111 for translating register numbers specified in a plurality of instructions into numbers of physical registers to be actually used in the executions of the instructions on the assumption that the instructions do not include a slide instruction and the second register number translator 112 for translating register numbers specified in a plurality of instructions into numbers of physical registers to be a actually used in the execution of the instructions on the assumption that the instructions include a slide instruction. In actuality, when a slide instruction is detected, the register number translation controller 130 switches results of translation output by the first register number translator 111 to results of translation output by the second register number translator 112 only for instructions succeeding the detected slide instruction in the original program instruction sequence, and outputs the results of translation as numbers of physical registers to be actually used in the execution of the instructions to the register rename unit 12. Thus, results of translation of register names specified in instructions into numbers of physical registers to be actually used in the execution of the instructions can be updated immediately without carrying out processing such as refetching of the instructions. As a result, the processing efficiency does not deteriorate due to updating of translation results.

The configuration of the register number translation controller 130 can be further expanded by employing three or more sets of register number translators which operate concurrently. In such a configuration, the results of translation of register names specified in instructions into numbers of physical registers to be actually used in the execution of the instructions can be updated immediately when the instructions being decoded at the same time include two or more slide instructions. It is probably obvious that such an expanded configuration is effective for a case in which the number of instructions decoded by the instruction decoder 11 at the same time is large.

Figure 5:
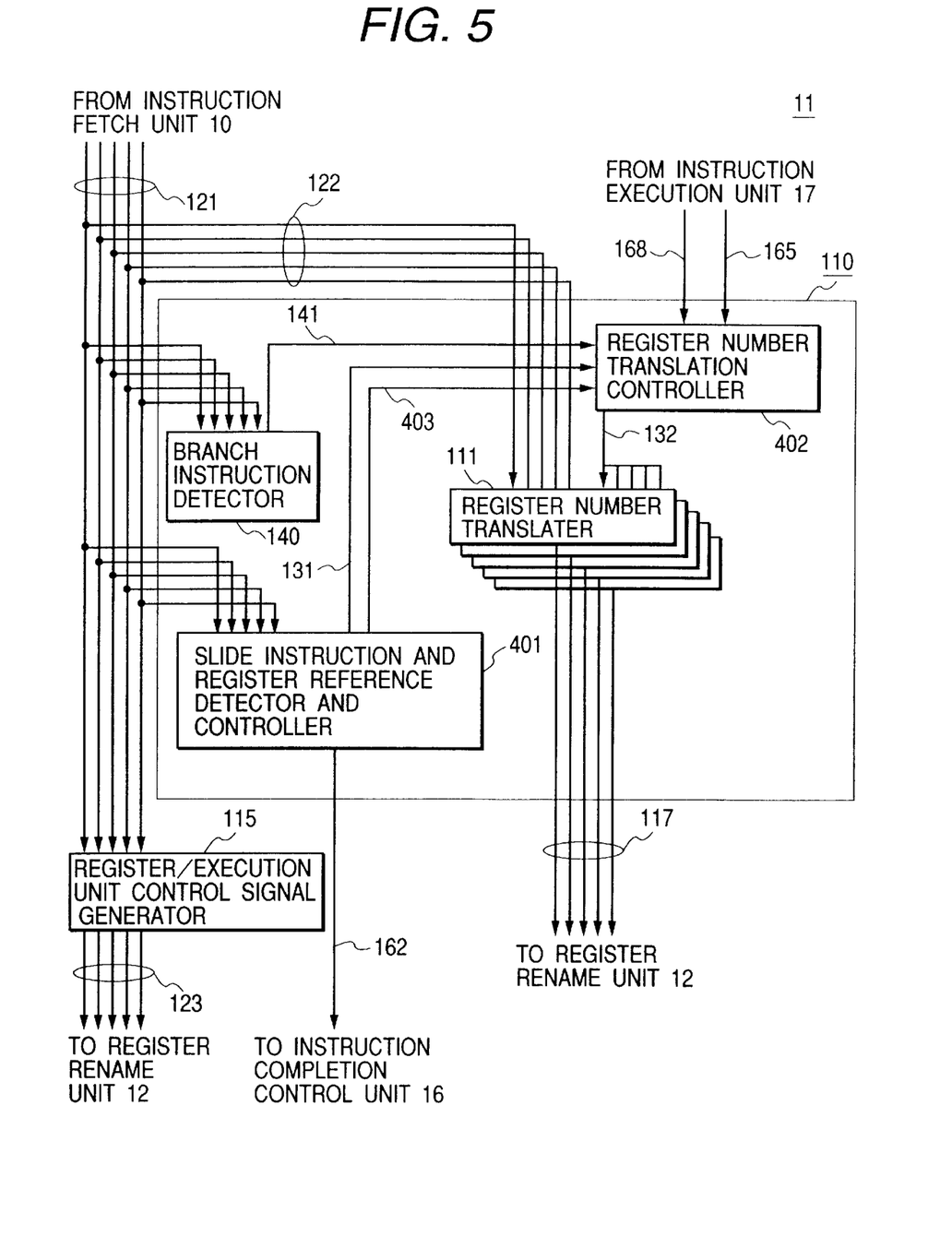
FIG. 5 is a block diagram showing another embodiment implementing the instruction decoder of the processor provided by the present invention.

FIG. 5 is a diagram showing another embodiment implementing the instruction decoder 111 provided by the present invention. Much like the instruction decoder 11 shown in FIG. 2, five instructions are decoded at the same time in this other embodiment.

The instruction decoder 11 shown in FIG. 5 includes the register number translator 111 for translating register names specified by five instructions by assuming that a slide instruction is not included in the five instructions. However, the instruction decoder 11 does not include the register number translator 112 for translating register names specified by five instructions by assuming that a slide instruction is included in the five instructions. In place of the register number translator 112, a slide instruction and register referencing detector and controller 401 is employed. Instead of generating the same slide instruction detection signal 131 as the embodiment shown in FIG. 2, the slide instruction and register referencing detector and controller 401 outputs a slide width signal 403 extracting a slide width directly from the code of a slide instruction to a register number translation controller 402. In the case of the embodiment shown in FIG. 2, the slide width is fixed and stored in the slide width register 202. In the embodiment shown in FIG. 5, on the other hand, the slide width varies from slide instruction to slide instruction. As a result, the instruction decoder 11 is capable of keeping up with different slide widths.

The slide instruction and register referencing detector and controller 401 employed in the embodiment shown in FIG. 5 generates a refetch mark signal 162 for an instruction, which makes an access to a register and is detected after a slide instruction, in addition to a refetch mark signal generated in the event of a second detected slide instruction. Other operations are the operations carried out in the same as the embodiment shown in FIG. 2.

Figure 6:
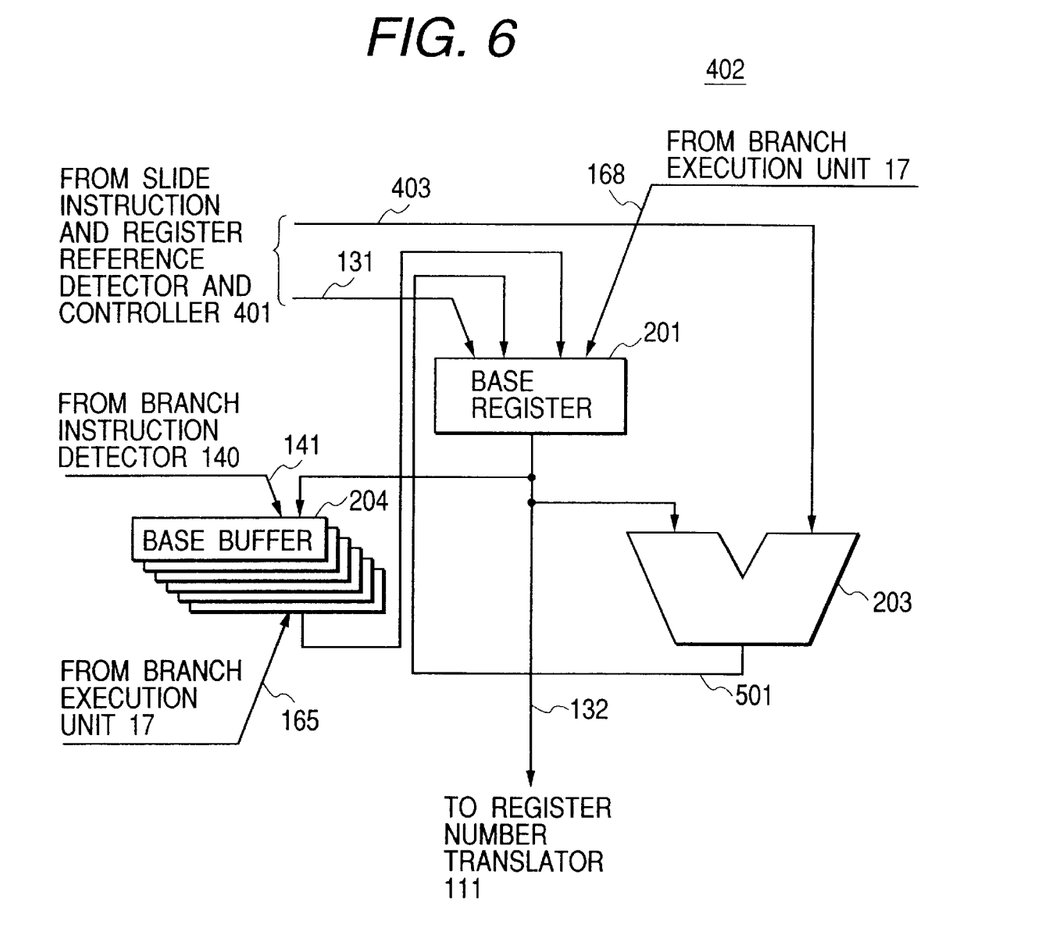
FIG. 6 is a block diagram showing an embodiment implementing a register number translation controller employed in the instruction decoder shown in FIG. 5

FIG. 6 is a diagram showing an embodiment implementing the register number translation, controller 402 employed in the instruction decoder 11 shown in FIG. 5.

Much like the embodiment shown in FIG. 3, the register number translation controller 402 shown in FIG. 6 comprises a base register 201 for holding a current base value for translation of a register number specified in an instruction into the number of a physical register to be actually used in the execution of the instruction, an adder 203 and a base buffer 204. The adder 203 employed in the register number translation controller 402 shown in FIG. 6 adds the contents of the base register 201 to the value of a slide width signal 403 transmitted by the slide instruction/register reference detector and controller 401. A sum 501 obtained as a result of the addition is stored in the base register 201 by a slide instruction detection signal 131. Other operations are the same as the register number translation controller 402 shown in FIG. 3.

Figure 7:
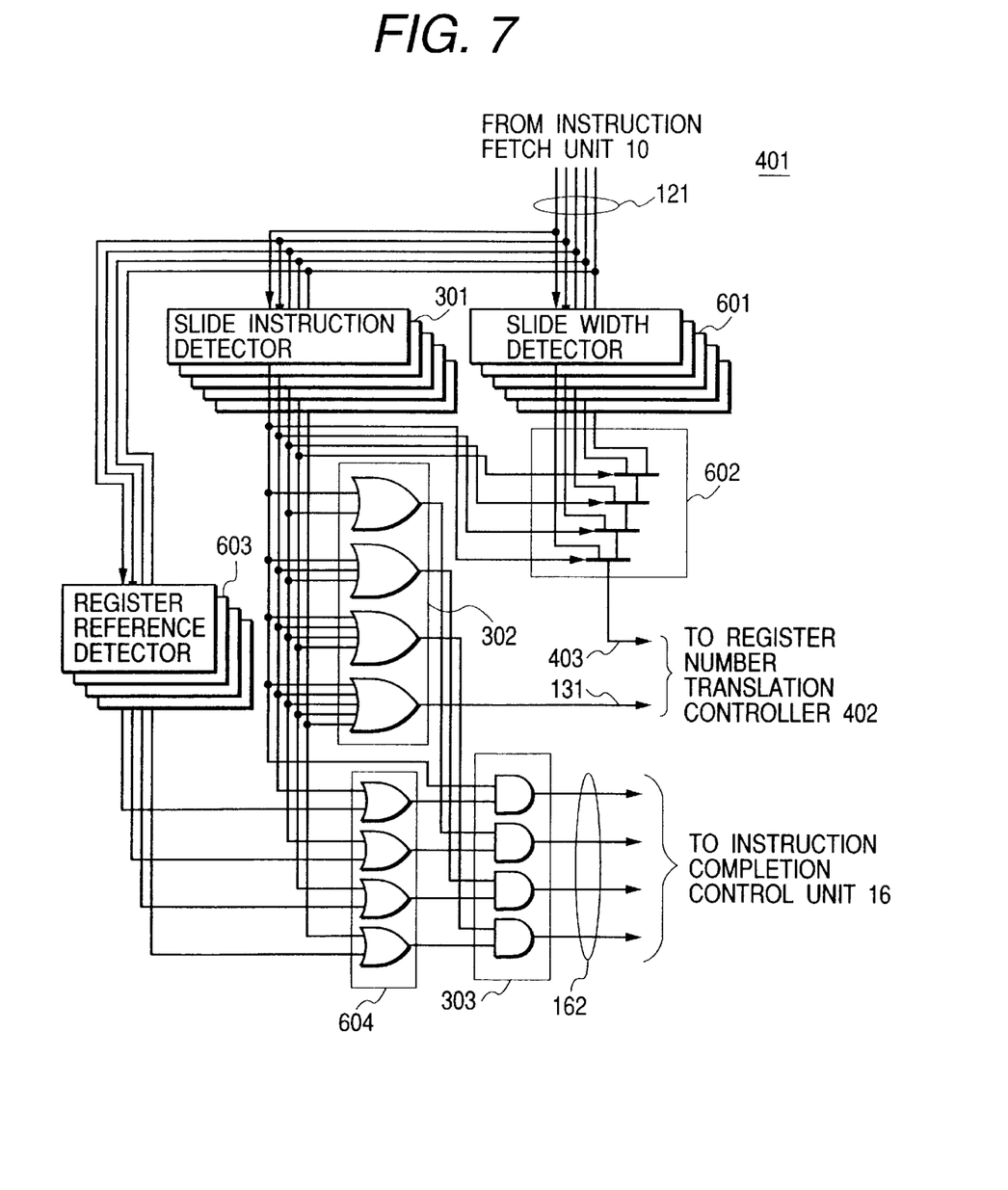
FIG. 7 is a block diagram showing an embodiment implementing a slide instruction and register referencing detector and controller employed in the instruction decoder shown in FIG. 5.

FIG. 7 is a diagram showing an embodiment implementing the slide instruction/register reference detector and controller 401 employed in the instruction decoder 11 shown in FIG. 5.

The slide instruction/register reference detector and controller 401 shown in FIG. 7 includes a slide width detector 601 for detecting slide widths specified in codes 121 of up to five instructors received from the instruction fetch unit 10 through signal lines 121. The outputs of the slide width detector 601 are supplied to a selector 602 to be selected in accordance with outputs of a slide instruction detector 301. As shown in the figure, a slide width specified in the code of a first detected slide instruction is selected as a slide width signal 403.

The slide instruction/register reference detector and controller 401 shown in FIG. 7 also includes a register reference detector 603 for detecting an instruction referencing a register among four instructions, namely, the second to fifth instructions. Outputs of the register reference detector 603 and the outputs of the slide instruction detector 301 are supplied to a second OR gate circuit 604 for computing logical sums of the outputs. The logical sums are supplied to an AND gate circuit 303 for generating refetch mark signals 162 to be appended to a second slide instruction and/or a subsequent slide instruction after the second one, or an instruction which references a register and succeeds a slide instruction.

Other operations of the slide instruction/register reference detector and controller 401 shown in FIG. 7 are the same as those of the embodiment shown in FIG. 4.

As described above, the embodiment implementing the instruction decoder 11 shown in FIG. 5 includes a slide instruction/register reference detector 401 and controller shown in FIG. 7 and a register number translation controller 402 shown in FIG. 6. When a slide instruction is detected in the instruction decoder 11, the translation base value 132 supplied to the register number translator 111 is updated. It is not until an operation to supply a next plurality of instructions to the instruction decoder 11 that the updated translation base value is actually used in the translation of register names specified in the instructions into names of physical registers to be actually used in the execution of the instructions. Thus, if the instruction decoder 11 detects an instruction which references a register, is decoded at the same time as the detected slide instruction and appears after the detected slide instruction, a refetch mark instruction 162 is issued and operations to refetch and re-decode instructions are carried out, starting with the detected instruction referencing a register. Thus, the embodiments shown in FIGS. 5 to 7 have a high probability of re-decoding and, hence, exhibit a processing efficiency disadvantage in comparison with the embodiments shown in FIGS. 2 to 4. On the other hand, the former offers an advantage of capacity of easily keeping up with different slide widths each specified by a slide instruction as described earlier. A slide width or a change width is defined as the magnitude of a change in number displacement used in translation of a register number specified by an instruction into the number of a physical register to be actually used in execution of the instruction.

A base value of the register number translation determining the translation relation described above is stored in the base buffer 204 employed in the register number translation controller 402 for each detected branch instruction as a history. If a speculation failure is ascertained in a speculative execution of a slide instruction, a base value is extracted from the history to restore a state prior to the speculative execution exactly as is the case with the configurations shown in FIGS. 2 to 4. That is, the embodiments shown in FIGS. 5 to 7 are the same as the embodiments shown in FIGS. 2 to 4 in that the translation of a register number can be updated with a high degree of efficiency.

Figure 8:
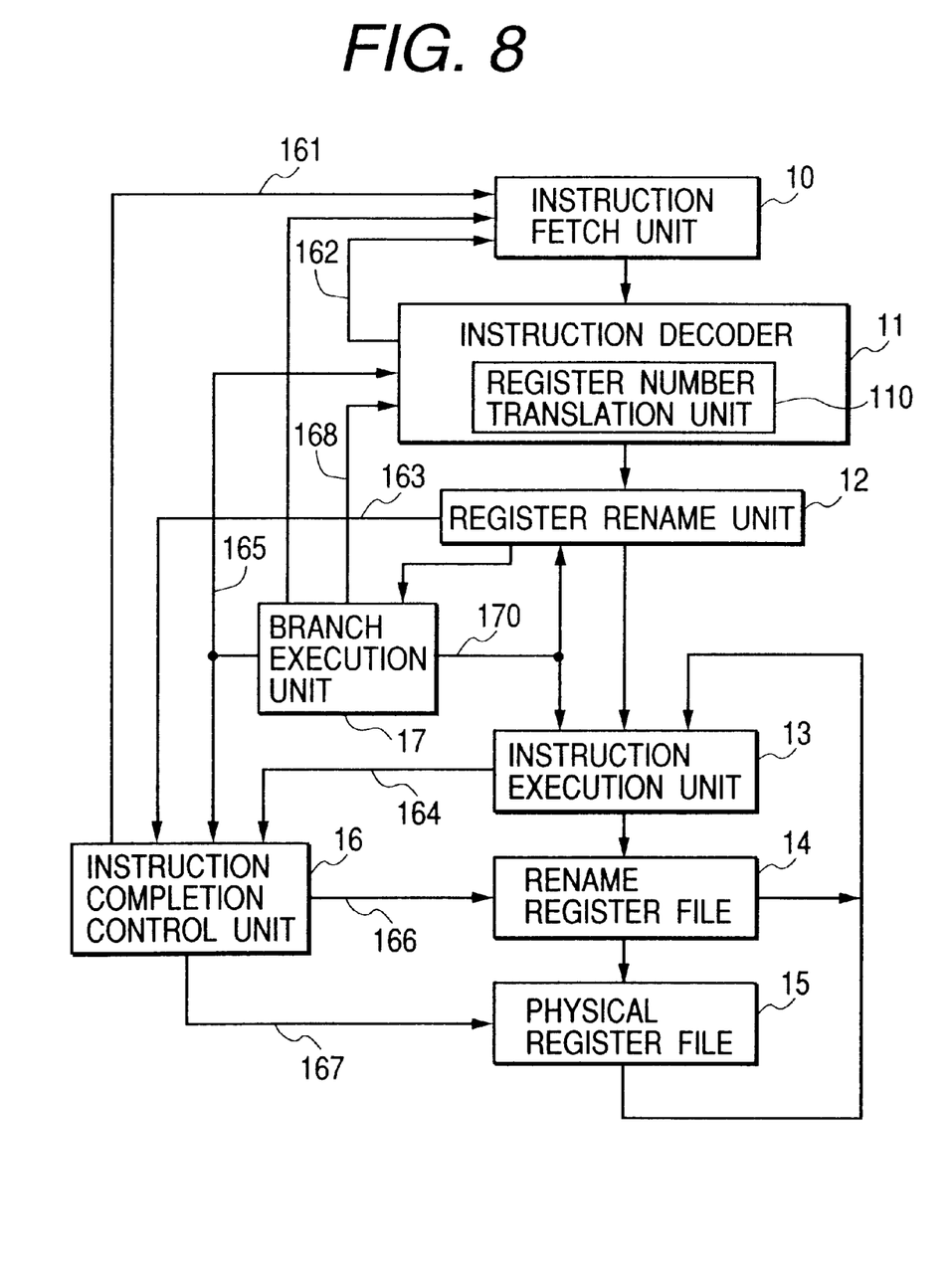
FIG. 8 is a block diagram showing another embodiment implementing the entire configuration of the processor provided by the present invention.

FIG. 8 is a diagram showing another embodiment implementing the entire configuration of the processor provided by the present invention. This embodiment is different from the embodiment shown in FIG. 1 in that, in the present embodiment, the refetch mark signal 162 generated by the instruction decoder 11 is output directly to the instruction fetch unit 10 instead of being supplied to the instruction completion control unit 16. In this way, an instruction can be refetched faster than the embodiment shown in FIG. 1. Other operations of the embodiment shown in FIG. 8 are the same as those shown in FIG. 1.

As a main topic of the description, a variety of embodiments explained above are exemplified by a configuration for translating a register number specified in an instruction into a different number of a physical register to be actually used in execution of the instruction. Of course, it is also possible to provide a configuration providing both features, namely, the translation of a register number specified in an instruction into a different number of a physical register to be actually used in execution of the instruction described above and the use of a register number specified by an instruction as it is as the number of a physical register to be actually used in execution of the instruction.

According to the present invention, a register number specified by an instruction can be translated into the number of a physical register to be actually used in execution of the instruction with a high degree of efficiency even for a configuration for carrying out register renaming in a superscalar architecture. In addition, it is also possible to speculatively execute a slide instruction for updating a base value used in translation of a register number specified by an instruction into the number of a physical register to be actually used in execution of the instruction with a high degree of efficiency.

What is claimed is:

1. A processor for executing an instruction with a register number specified by said instruction different from the number of a physical register to be actually used, said processor comprising:

a register number translation unit for translating a register number specified by an instruction into the number of a physical register; and a register rename unit for temporarily replacing the number of a physical register with the number of a rename register, wherein, after said register number translation unit translates a register number specified by an instruction into the number of a physical register, said register rename unit temporarily replaces said number of said physical register with the number of a rename register, wherein said register number translation unit includes an instruction decoder for decoding an instruction to determine what is to be executed for said instruction prior to execution of said instruction, wherein said instruction decoder decodes a plurality of instructions in parallel, wherein said register number translation unit includes:

a first register number translator for translating a register number specified by each of said instructions being decoded in parallel into the number of a physical register in accordance with register number translation prior to a change caused by a slide instruction for updating translation of a register number specified by an instruction into the number of a physical register in said register number translation unit on the assumption that said instructions being decoded in parallel do not include said slide instruction, and a second register number translator for translating a register number specified by each of said instructions being decoded in parallel into the number of a physical register in accordance with register number translation after a change caused by a slide instruction for updating translation of a register number specified by an instruction into the number of a physical register in said register number translation unit on the assumption that said instructions being decoded in parallel include said slide instruction, and wherein there is also provided a translation result switching unit which is used for switching a result of translation produced by said register number translation unit from a result produced by said first register number translator for instructions preceding a slide instruction in an original program instruction sequence to a result produced by said second register number translator for instructions succeeding said slide instruction in said original program instruction sequence when a result of decoding said instructions indicates that said slide instruction is included among said instructions.

2. A processor according to claim 1, said processor further including a register number translation slide width register for storing a slide width used in an execution of a slide instruction for changing translation of a register number specified by an instruction into the number of a physical register wherein a result of translation output by said second register number translator is used after said execution of said slide instruction.

3. A processor according to claim 1, wherein said instruction decoder has a means for detecting existence of two or more slide instructions among said instructions being decoded in parallel, and wherein there is provided a means which is used for requesting said instruction decoder to re-decode instructions following a second slide instruction when two or more slide instructions are detected.

4. A processor wherein an instruction with a register number specified by said instruction different from the number of a physical register to be actually used may be executed and a slide instruction changes translation of a register number specified by an instruction into the number of a physical register, said processor having an instruction decoder which is used for decoding a plurality of instructions in parallel and provided with:

a first register number translator for translating a register number specified by each of said instructions being decoded in parallel into the number of a physical register in accordance with register number translation prior to a change caused by a slide instruction for updating translation of a register number specified by an instruction into the number of a physical register on the assumption that said instructions being decoded in parallel do not include said slide instruction; and a second register number translator for translating a register number specified by each of said instructions being decoded in parallel into the number of a physical register in accordance with register number translation after a change caused by a slide instruction for updating translation of a register number specified by an instruction into the number of a physical register on the assumption that said instructions being decoded in parallel include said slide instruction; and a translation result switching unit which is used for switching a result of translation produced by said instruction decoder from a result produced by said first register number translator for instructions preceding a slide instruction in an original program instruction sequence to a result produced by said second register number translator for instructions succeeding said slide instruction in said original program instruction sequence when a result of decoding said instructions indicates that said slide instruction is included among said instructions.

5. A processor according to claim 4, said processor further including a register number translation slide width register for storing a slide width used in an execution of a slide instruction for changing translation of a register number specified by an instruction into the number of a physical register, wherein a result of translation output by said second register number translator is used after said execution of said slide instruction.

6. A processor according to claim 4 wherein:

said instruction decoder has a means for detecting existence of two or more slide instructions among said instructions being decoded in parallel; and there is provided a means which is used for requesting said instruction decoder to re-decode instructions following a second slide instruction when two or more slide instructions are detected.

7. A processor also for executing an instruction with a register number specified by said instruction different from the number of a physical register to be actually used and executing a slide instruction for changing translation of a register number specified by an instruction into the number of a physical register, said processor having an instruction decoder which is used for decoding a plurality of instructions in parallel and provided with:

means for detecting existence of slide instruction among said instructions being decoded in parallel;

resister number translation means for translating register number specified by an instruction into the number of a physical register and for updating register number translation of a register number specified by an instruction into the number of a physical register upon detection of a slide instruction; and a means for detecting existence of an instruction referencing a register and following a detected slide instruction among said instructions being decoded in parallel in an original program instruction sequence, wherein, by having said instruction decoder re-decode instructions following said instruction referencing a register, a register number specified by each of said re-decoded instructions is translated into the number of physical register in accordance with said updated register number translation.

8. A processor which is provided with an instruction decoder for decoding an instruction prior to execution of said instruction to determine what is to be executed for said instruction and is capable of executing a register specifying instruction with a register number specified by said register specifying instruction different from the number of a physical register to be actually used; wherein said instruction decoder has:

a register number translation unit for translating a register number specified by an instruction into the number of a physical register;

a register rename unit for further replacing said number of a physical register temporarily by the number of a rename register;

an instruction execution unit for executing an instruction in accordance with what is to be executed for said instruction and in accordance with the number of a rename register allocated by said register rename unit by allowing out of order processing; and an instruction completion unit used at the end of execution of a register write instruction for transferring the contents of a rename register with the number thereof replacing the number of a physical register to said physical register specified by a number obtained as a result of translation of a register number specified by said register write instruction in accordance with an original program instruction sequence.

9. A processor for executing instructions successively fetched in an order according to a program and for storing execution results in physical resisters, said processor comprising:

an instruction decoder for successively decoding said instructions, including a register number translation unit for translating each of register numbers specified in decoded instructions into each number of a corresponding physical register;

a register rename unit for replacing a translated number of a destination physical register, in which an execution result of a decoded instruction is to be finally stored, with a number of a rename register which is uniquely allocated to said decoded instruction for temporarily storing said execution result;

an instruction execution means for executing said instructions and temporarily storing each of execution results into a corresponding rename register specified by said register rename unit, with permitting out-of-order execution; and an instruction completion means for successively purging the temporarily stored execution results from respective rename registers and for storing each of the execution results into a corresponding physical register specified by said register number translation unit in the order according to the program.

10. A processor according to claim 9, wherein said instruction decoder decodes a plurality of instructions in parallel, wherein said register number translation unit includes:

a first register number translator for translating a register number specified by each of said instructions being decoded in parallel into the number of a physical register in accordance with register number translation prior to a change caused by a slide instruction for updating translation of a register number specified by an instruction into the number of a physical register in said register number translation unit on the assumption that said instructions being decoded in parallel do not include said slide instruction, and a second register number translator for translating a register number specified by each of said instructions being decoded in parallel into the number of a physical register in accordance with register number translation after a change caused by a slide instruction for updating translation of a register number specified by an instruction into the number of a physical register in said register number translation unit on the assumption that said instructions being decoded in parallel include said slide instruction, and wherein there is also provided a translation result switching unit which is used for switching a result of translation produced by said register number translation unit from a result produced by said first register number translator for instructions preceding a slide instruction in an original program instruction sequence to a result produced by said second register number translator for instructions succeeding said slide instruction in said original program instruction sequence when a result of decoding said instructions indicates that said slide instruction is included among said instructions.

11. A processor according to claim 10, wherein said processor further includes a register number translation slide width register for storing a slide width used in an execution of a slide instruction for changing translation of a register number specified by an instruction into the number of a physical register wherein a result of translation output by said second register number translator is used after said execution of said slide instruction.

12. A processor according to claim 9, wherein said Instruction decoder has a means for detecting existence of two or more slide instructions among said instructions being decoded in parallel, and wherein there is provided a means which is used for requesting said instruction decoder to re-decode instructions following a second slide instruction when two or more slide instructions are detected.

* * * * *